United States Patent [19]

Lachaussee

[11] 4,163,930
[45] Aug. 7, 1979

[54] AUTOMATIC CONTROL APPARATUS FOR A MACHINE HAVING SUCCESSIVE WORK STATIONS

[75] Inventor: Maurice Lachaussee, Ans, Belgium

[73] Assignee: Etablissements Lachaussee, Societe Anonyme, Belgium

[21] Appl. No.: 863,597

[22] Filed: Dec. 22, 1977

[30] Foreign Application Priority Data

Dec. 28, 1976 [BE] Belgium .................... 173695

[51] Int. Cl.² .......................................... G05B 11/32
[52] U.S. Cl. ........................... 318/563; 318/562; 318/565
[58] Field of Search .................. 318/563, 562, 565

[56] References Cited

U.S. PATENT DOCUMENTS 3,760,251  9/1973  Rosi et al. ................ 318/601

Primary Examiner—B. Dobeck

Attorney, Agent, or Firm—Hill, Van Santen, Steadman, Chiara & Simpson

[57] ABSTRACT

An apparatus is described for controlling the sequences of operations executed at the various work stations. At each work station there is provided detecting means arranged for detecting the correct completion of an operation, e.g. the correct positioning of a part in a support such as a case for making a cartridge, and generating a fault signal when the operation is not correctly completed. The fault signal is written into shift register means and shifted in response to a timed control signal, the successive states of this shift register means being compared with a reference signal representing the number of steps along the path between that work station and the next. When the state of the shift register means is coincident with the reference signal, an inhibit signal is produced for inhibiting the operation at at least one next work station.

5 Claims, 1 Drawing Figure

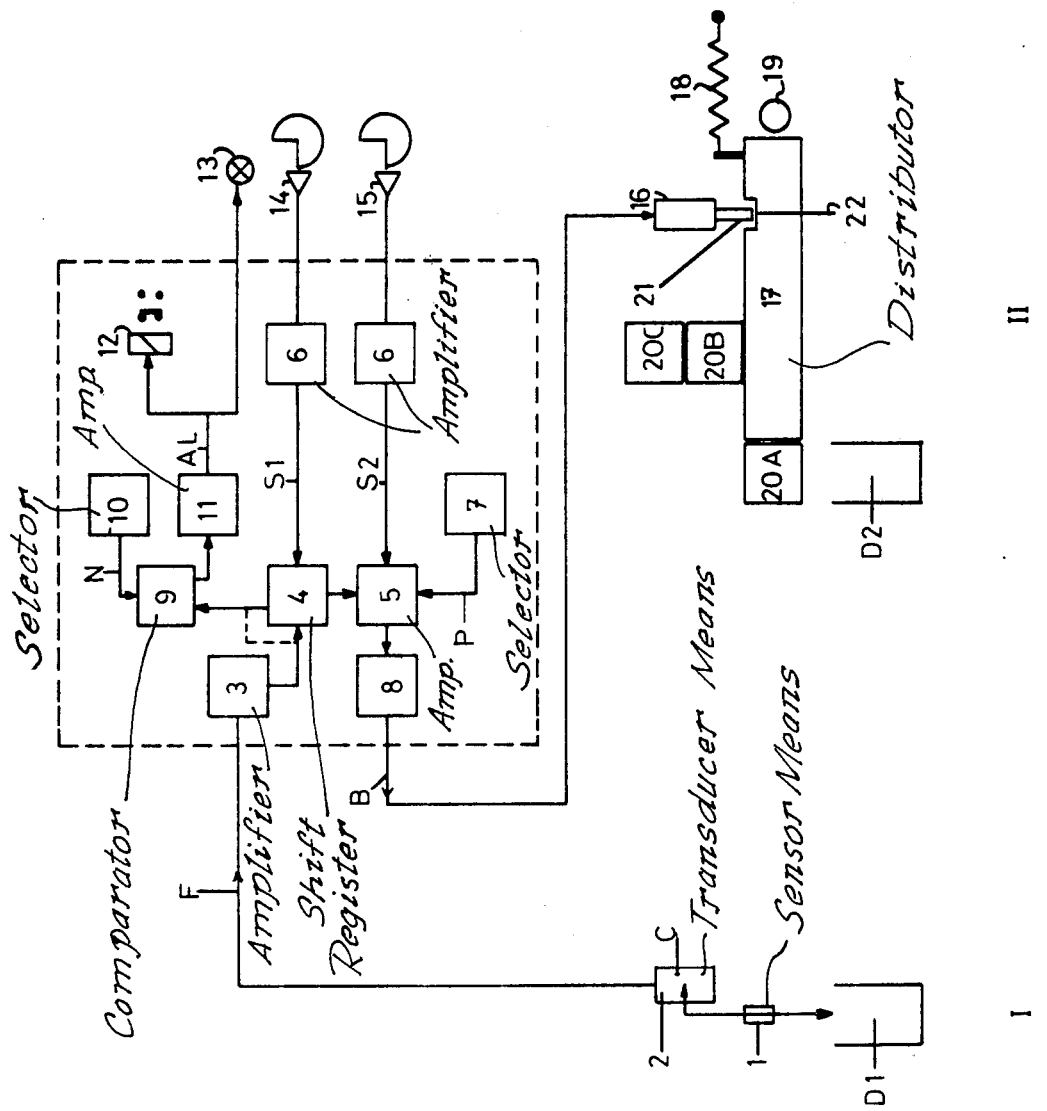

AUTOMATIC CONTROL APPARATUS FOR A MACHINE HAVING SUCCESSIVE WORK STATIONS

FIELD OF THE INVENTION

The present invention relates to a control apparatus for automatically controlling the sequences of operations executed at successive work stations on a machine for making a product. An exemplary application for this apparatus is controlling the operations executed on a cartridge-making machine.

The purpose of such a control apparatus is to achieve a reliable automatic control which guarantees a high production rhythm while reducing the number of machine stops to a minimum.

SUMMARY OF THE INVENTION

At each work station there is provided detecting means arranged for detecting the correct completion of an operation, e.g. the correct positioning of a part in a support such as a case for making a cartridge, and generating a fault signal when the operation is not correctly completed. The fault signal is written into shift register means and shifted in response to a timed control signal, the successive states of this shift register means being compared with a reference signal representing the number of steps along the path between that work station and the next. When the state of the shift register means is coincident with the reference signal, an inhibit signal is produced for inhibiting the operation at at least one next work station.

Means are also provided for counting the number of successive fault signals written into the shift register means and producing an alarm signal when this number reaches a predetermined number.

DESCRIPTION OF THE DRAWINGS

The apparatus of the invention is described hereinafter by reference to an embodiment thereof illustrated in the appended drawing representing schematically the control apparatus at one work station.

DESCRIPTION OF AN EMBODIMENT

The following description relates to a cartridge-making machine. Such a machine comprises various successive work stations at each of which a particular operation is executed. Each operation consists in positioning a part in the cases which will form the cartridges and for each operation it is required that the presence and the correct positioning of the part in the cases are carefully controlled.

In the drawing there is schematically shown a case D1 at a first work station I and a case D2 at a second work station II. The distance between the work stations is subdivided into a determined and variable number of steps.

At work station I the presence and correct positioning of the part is detected by detecting means which comprise by way of example a sensor means 1 mounted to be moved by an actuating mechanism (not shown) to sense the interior of the case D1, this movement being stopped by the presence of a part within the case. The sensor 1 is coupled to a transducer means 2 which is adapted to be responsive to a control signal C for producing an electric fault signal F when the sensor 1 has not reached the correct level within the case D1. For instance, the transducer 2 can be comprised of a photoelectric cell located so as to be illuminated by a light beam except when the sensor 1 is at a determined level within the case D1. For that purpose, a flag can be provided integral with the sensor 1, so as to interrupt the light beam at a particular level, that is the correct position of the part within the case D1. The signal F generated by the transducer 2 indicates a fault.

The fault signal F, after having been amplified in the amplifier 3, is applied as an input to a shift register 4 which is a device well known in the art for serving as a store device. The signal from amplifier 3 is written into register 4 in response to a timed control signal S1 having the purpose of fixing the time during which the fault signal is taken into account and of advancing the register 4 step by step at a determined rhythm.

The output from register 4 is coupled to an input to a comparator means 5 which is arranged for comparing the successive states of register 4 with a predetermined reference state. In the examplary embodiment illustrated in the drawing, the reference state is determined by the coincidence of a reference signal P produced by a selector 7 and of a timed control signal S2.

The comparator 5 produces a signal B when the state of register 4 is equal to the reference state, that is after the fault signal F having been advanced by a required number of steps in register 4. This number of steps, which is selected on selector 7, will correspond to the number of travel steps of the cases between the work station I and the next work station II. This signal B from the comparator 5, after having been amplified in amplifier 8, is used as an inhibit signal for inhibiting the operation at the next work station or at one or several next work stations.

In the embodiment illustrated by way of example, the inhibit signal B is used to operate a blocking device 16 for inhibiting the operation of a distributing mechanism at work station II. This mechanism comprises a distributor 17 arranged for feeding, one at a time, parts represented by blocks 20A, 20B and 20C. For that purpose, the distributor 17 is normally loaded by the spring 18, so as to allow a part 20A to be placed ahead of the distributor 17. Associated with the latter is a push-piece 19 which is actuated by a drive mechanism (not shown) for actuating the distributor 17 in order to bring the part 20A into a position for allowing it to be introduced within a case D2 as shown in the drawing. The blocking device 16 is arranged to be responsive to the inhibit signal B for actuating a stop means 21 to cause it to engage a slot 22 formed in the distributor 17, thereby to prevent homing of the latter under the action of spring 18 and consequently to prevent the positioning of the next part 20B. Thus, when a fault occurs at work station I, a signal is produced which inhibits the operation of the distributing mechanism at the next work station II and consequently inhibits the operations to be executed at the latter station.

The timing signals S1 and S2 can for instance be produced by sensors 14 and 15 arranged to be energized by the action of cams mounted on a common camshaft of the machine. These timing signals are amplified by amplifiers 6 before being applied to the register 4 and the comparator 5, respectively.

The control apparatus at each work station further comprises means for counting the number of successive fault signals and means for comparing the content of the counting means with a predetermined count representing the admitted number of successive faults. In the embodiment illustrated by way of example, these means can be comprised of a second comparator means 9 connected for having its state changed in response to each successive fault signal being applied to register 4 and for comparing its successive states with a reference signal N produced by a selector 10. When the number of successive faults reaches the number represented by the reference signal N, the comparator 9 produces an alarm signal AL which, after having been amplified in amplifier 11, serves to energize a suitable indicator such as an indicating lamp 13 and/or actuate an alarm device represented by the control relay 12. The comparator 9 is arranged to be reset in response to a fault signal F disappearing at the input to register 4.

What is claimed is:

1. A control apparatus for controlling the sequences of operations executed at successive work stations on a machine, the path between the work stations being subdivided into a number of steps, said control apparatus comprising at each work station:

detecting means arranged for detecting the correct completion of an operation and generating a fault signal when the operation is not correctly completed, shift register means connected for accepting the fault signal from the detecting means in response to a timed control signal and advancing said fault signal step by step under control of said control signal, comparator means connected for comparing the successive states of the shift register means with a reference signal representing the number of travel steps between the present work station and the next, this comparator means being arranged for producing an inhibit signal in response to a state of the shift register means being coincident with the reference signal, said inhibit signal serving to inhibit the operation at at least one next work station.

2. A control apparatus according to claim 1 for controlling the positioning of successive parts in a support at successive work stations, wherein the detecting means comprise sensor means mounted for sensing the presence of a part in the support and arranged for producing a signal representing the position of said part, and transducer means connected for comparing the signal representing the position of the part with a reference signal representing the correct position of the part and for producing a signal in response to the two signals being unequal.

3. A control apparatus according to claim 1, further comprising at each work station: counting means connected for counting the number of successive fault signals written into the shift register means, means for comparing the content of said counting means with a reference signal representing a predetermined count and producing an alarm signal in response to the content of the counting means being equal to the reference signal, and means connected to reset the counting means in response to a fault signal disappearing at the input to the shift register means.

4. A method for controlling the sequences of operation being executed at successive work stations on a machine, the path between the work stations being subdivided into a number of steps, the steps of controlling at each work station as follows: detecting the correct completion of an operation and generating a fault signal when the operation is not correctly completed, accepting the fault signal from the detecting step in response to a timed control signal and advancing the fault signal step-by-step under control of the control signal, comparing the successive states of the accepted fault signal with a reference signal representing the number of travel steps between the present work station and the next, the comparing step being adapted for producing an inhibit signal in response to the state of the accepted fault signal coincident with the reference signal, the inhibit signal serving to inhibit the operation at at least one next work station.

5. A control apparatus according to claim 1, wherein the inhibit signal is coupled for blocking the feed means for the part at at least one next work station.

* * * * *